(12) United States Patent
Gloger et al.

(10) Patent No.: US 7,519,237 B2
(45) Date of Patent: Apr. 14, 2009

(54) METHOD FOR CHARACTERIZING STORED INFORMATION

(75) Inventors: Joachim Gloger, Bibertal (DE); Stefan Hahn, Ulm (DE)

(73) Assignee: Daimler AG, Stuttgart (DE)

( * ) Notice: Subject to any disclaimer, the term of this patent is extended or adjusted under 35 U.S.C. 154(b) by 787 days.

(21) Appl. No.: 10/469,611

(22) PCT Filed: Feb. 28, 2002

(86) PCT No.: PCT/EP02/02171

§ 371 (c)(1),
(2), (4) Date: Jan. 12, 2004

(87) PCT Pub. No.: WO02/086806

PCT Pub. Date: Oct. 31, 2002

(65) Prior Publication Data

US 2004/0111434 A1 Jun. 10, 2004

(30) Foreign Application Priority Data

Mar. 2, 2001 (DE) ................. 101 10 275

(51) Int. Cl.
G06K 9/00 (2006.01)
G06K 9/62 (2006.01)
G06K 9/54 (2006.01)
G06F 7/00 (2006.01)

(52) U.S. Cl. ............... 382/305; 382/115; 382/209; 707/1

(58) Field of Classification Search ............ 382/209, 382/100, 103, 115–132, 217–219, 305–307; 707/1–6

See application file for complete search history.

(56) References Cited

U.S. PATENT DOCUMENTS

| 4,672,683 A | * | 6/1987 | Matsueda | 382/305 |
| 5,148,522 A | * | 9/1992 | Okazaki | 715/855 |
| 5,179,652 A | * | 1/1993 | Rozmanith et al. | 715/747 |
| 5,189,709 A | * | 2/1993 | Wang et al. | 382/215 |
| 5,202,828 A | * | 4/1993 | Vertelney et al. | 715/236 |
| 5,220,648 A | * | 6/1993 | Sato | 707/3 |
| 5,351,310 A | * | 9/1994 | Califano et al. | 382/199 |
| 5,421,008 A | * | 5/1995 | Banning et al. | 707/4 |
| 5,579,471 A | * | 11/1996 | Barber et al. | 715/700 |

(Continued)

OTHER PUBLICATIONS

Using relevance feedback in content-based image metasearch Benitez, A.B.; Beigi, M.; Shih-Fu Chang EEE Internet Computing, vol. 2, Iss.4, Jul./Aug. 1998 pp. 59-69.*

(Continued)

*Primary Examiner*—Matthew C Bella
*Assistant Examiner*—Manav Seth
(74) *Attorney, Agent, or Firm*—Davidson, Davidson & Kappel, LLC

(57) ABSTRACT

A method for characterizing a pattern present as stored information, includes the steps of generating a characterizing proposal for the pattern using a server computer system, presenting the pattern and the characterizing proposal to a client computer using a computer program via the Internet so as to enable a user to perform an evaluation of the characterizing proposal, and receiving an evaluation input from the user at the server computer system. The evaluation input is one of an acceptance input of the characterizing proposal and a rejection input of the characterizing proposal. The rejection input includes an alternative characterizing proposal.

11 Claims, 1 Drawing Sheet

U.S. PATENT DOCUMENTS

| | | | |
|---|---|---|---|
| 5,600,831 A * | 2/1997 | Levy et al. | 707/2 |
| 5,668,986 A * | 9/1997 | Nilsen et al. | 707/10 |
| 5,696,964 A * | 12/1997 | Cox et al. | 707/5 |
| 5,751,286 A * | 5/1998 | Barber et al. | 715/835 |
| 5,809,171 A * | 9/1998 | Neff et al. | 382/209 |
| 5,852,823 A * | 12/1998 | De Bonet | 707/6 |
| 5,893,095 A * | 4/1999 | Jain et al. | 707/6 |
| 6,002,798 A * | 12/1999 | Palmer et al. | 382/176 |
| 6,088,483 A * | 7/2000 | Nakano et al. | 382/209 |
| 6,130,962 A * | 10/2000 | Sakurai | 382/190 |
| 6,154,567 A * | 11/2000 | McGarry | 382/219 |
| 6,256,409 B1 * | 7/2001 | Wang | 382/170 |
| 6,275,613 B1 * | 8/2001 | Aiger | 382/195 |
| 6,292,577 B1 * | 9/2001 | Takahashi | 382/128 |
| 6,347,313 B1 * | 2/2002 | Ma et al. | 707/3 |
| 6,415,282 B1 * | 7/2002 | Mukherjea et al. | 707/3 |
| 6,445,822 B1 * | 9/2002 | Crill et al. | 382/218 |
| 6,510,406 B1 * | 1/2003 | Marchisio | 704/9 |
| 6,564,206 B1 * | 5/2003 | Ikeda | 707/3 |
| 6,674,915 B1 * | 1/2004 | Wang | 382/263 |
| 6,748,398 B2 * | 6/2004 | Zhang et al. | 707/104.1 |
| 7,242,988 B1 * | 7/2007 | Hoffberg et al. | 700/28 |
| 7,389,208 B1 * | 6/2008 | Solinsky | 382/156 |

OTHER PUBLICATIONS

A relevance feedback architecture for content-based multimedia information retrieval systems Yong Rui; Huang, T.S.; Mehrotra, S.; Ortega, M. Content-Based Access of Image and Video Libraries, 1997. Proceedings. IEEE Workshop on, Vol., Iss., Jun. 20, 1997 pp. 82-89.*

Image retrieval with relevance feedback, L. Fang, A.Y. Hock, Applied Imagery Pattern Recognition Workshop, 2000. Proceedings. 29th, Oct. 16-18, 2000, pp. 85-91.*

Jain et al. "Object Matching Using Deformable Templates" IEEE Transactions on Pattern Analysis and Machine Intelligence, vol. 18, No. 3, Mar. 1995, pp. 267-278.

Ohm et al. "Feature-Based Cluster Segmentation of Image Sequences" ICIP 97 International Conference on Image Processing, Jul. 1997, pp. 178-181.

Horvath "Oplische Lemkurven" in Messen und Pruefen, vol. 35, No. 5, May 1999 pp. 32-34 (see International Search Report).

Mills et al. "Pattern Recognition Prototyping Tool" in Image Processing, Oct. 26, 1997, pp. 312-315.

* cited by examiner

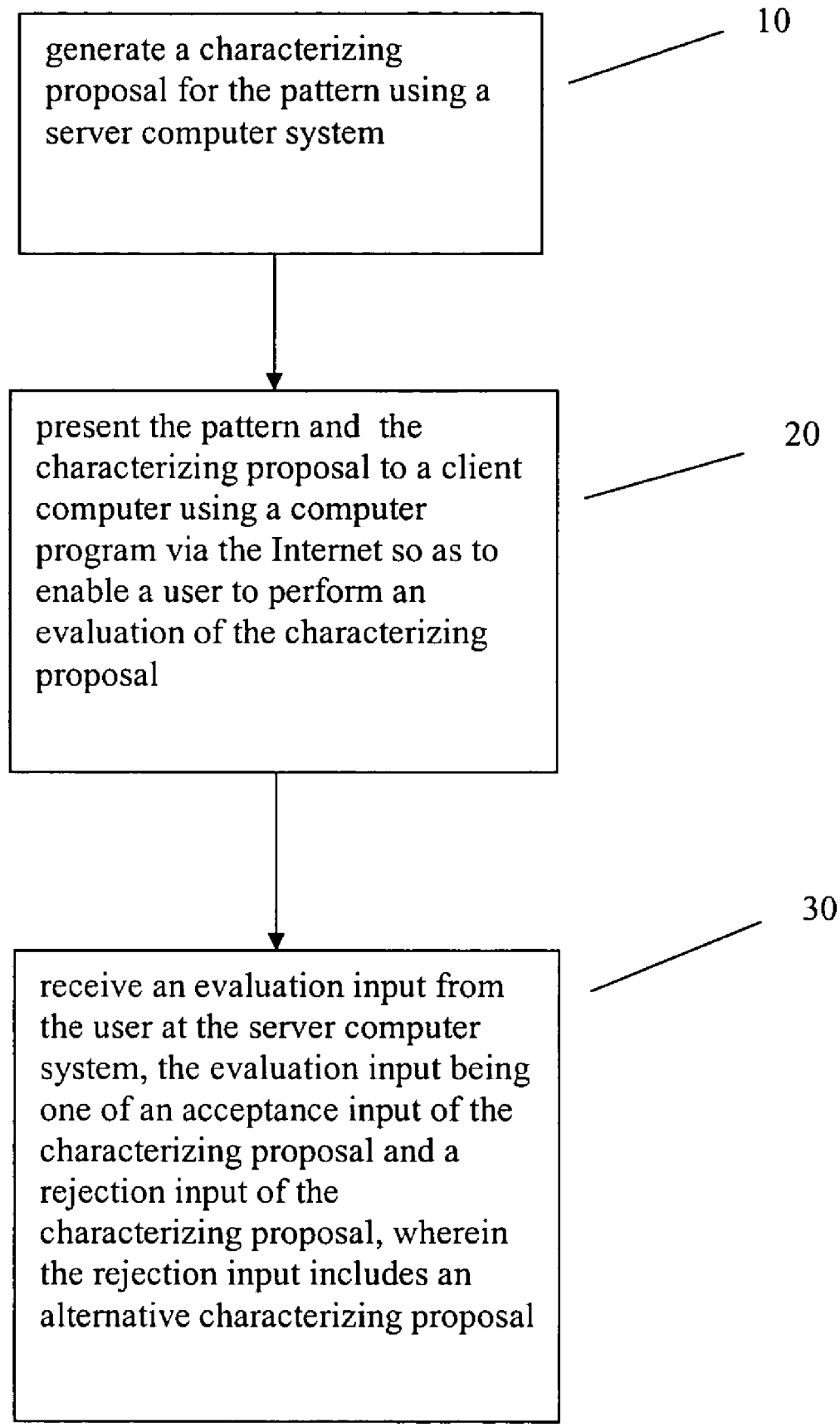

METHOD FOR CHARACTERIZING STORED INFORMATION

BACKGROUND

The present invention relates to a method for characterizing patterns.

The manual characterization of samples by people is a time-consuming and expensive process. In order to speed up this process, methods are used which generate a characterization proposal. The processing employee must either accept the proposal or modify it if the proposal is not correct. Characterization methods are used in particular in classification methods in which a set of parameters for identifying objects is determined using training examples. The training data record must representatively cover all the peripheral conditions of the identification task here. In order to identify street scenes, samples of several thousand to tens of thousands of manually processed images containing all the potentially occurring classes of objects, for example passenger cars, trucks, two-wheeled vehicles, pedestrians, weather conditions etc., are required.

From the processing of colored video images, a method is known in which an object, for example a tree, is characterized manually in the first image in an image sequence (J. R. Ohm, P. Ma: "Feature-Based Cluster Segmentation of Image Sequences", Int. Conf. on Image Processing, Vol. III, 1997, pages 178-181). With this predefined information an attempt is made to identify again the same object in the next image of the image sequence. In this context, the color information of the object is preferably used to distinguish the object from the rest of the image. This method is not suitable for gray value images. The manual processing of the object is very time-consuming during the characterization process.

A method is known (A. K. Jain, Yu Zhong, S. Lakshamanan, "Object matching using deformable templates", IEEE Trans. on Pattern Analysis and Machine Intelligence, Vol. 18, No. 3, March 1996, p. 267-278) in which a database of automatically generated contour patterns is used to characterize objects (patterns) in image data. The contour patterns are automatically adapted to the objects and superimposed on them. The image data together with the contour patterns superimposed on them are then presented to a viewer on a screen.

SUMMARY OF THE INVENTION

The object of the invention is to find a novel method for automatically characterizing patterns which ensures that the pattern and characterization coincide to an optimum degree.

The present invention provides a method for characterizing a pattern present as stored information. The method includes
generating a characterizing proposal assigned to the pattern using a server computer system;
presenting the pattern and the characterizing proposal to a client computer using a computer program via the Internet so as to enable a user to perform an evaluation of the characterizing proposal; and
receiving an evaluation input from the user at the server computer system.

The invention has the advantage that a large gain in time in the characterization process is achieved during the automatic generation of characterization proposals, even when there are faulty proposals owing to the mass of the samples to be characterized. It is also advantageous that automatic methods are used for generating the characterization proposals and said methods can be very time-consuming and demanding in terms of computing as the characterization proposals can be generated independently of the characterization process. The characterization proposals which are generated are stored in a database until they are checked by the processing employee and are presented to the processing employee while the characterization process is taking place.

When automatic methods are used for generating characterization proposals, which methods process the proposals very quickly and present them to the processing employee, it is advantageous that the proposals can be generated directly during the characterization process.

BRIEF DESCRIPTION OF THE DRAWINGS

The invention is explained in more detail by means of an exemplary embodiment, and in the drawing, in which:

FIG. 1 shows a schematic representation of a method according to the present invention.

DETAILED DESCRIPTION

As shown in FIG. 1, a method for characterizing a pattern present as stored information according to the present invention includes the step of generating a characterizing proposal using a server computer system. [Block 10]. The characterizing proposal and the pattern are then presented to a client computer using a computer program and via the internet so as to enable a user to perform an evaluation of the characterizing proposal. [Block 20]. Next, an evaluation input is received from the user at the server computer. [Block 30]. The evaluation input is either an acceptance input of the characterizing proposal or a rejection input of the evaluation proposal. The rejection input includes an alternative characterizing proposal.

The pattern which is to be characterized is present in a computer system in electronic form. The pattern is recorded, for example, with a video camera or a document is scanned into a computer. Acoustic patterns, which are present in electronic form, are also characterized.

A characterization proposal is generated for the pattern. This proposal can be generated separately from the actual characterization process, for example if the method for generating the proposal is very time-consuming. However, it is also possible to generate the proposal during the characterization process, for example if the method is capable of generating the proposals in real time or virtually in real time.

The pattern and the generated characterization proposal are presented to the processing employee in suitable form on a display by means of a computer program. In the case of images, for example, the original image is presented together with the characterization proposal which is presented in the form of a closed line configuration, for example. The line configuration is superimposed on the original image so that the processing employee can see both the line configuration and the original image. If the object to be characterized is characterized with sufficient precision by the generated proposal, the proposal is accepted by the processing employee and stored in the system as a characterization. If the proposal is too imprecise, there are a number of possibilities. On the one hand, the processing employee will delete the incorrect proposal (or modify it) himself and generate his own characterization proposal manually. On the other hand, it is possible for the proposal to be rejected by the processing employee. The proposal is then used as a basis for a further method in order to still arrive at a correct characterization proposal. Furthermore, it is possible to delete the proposal completely and to try to generate a suitable proposal using a more complex method.

In order to cope with a large number of samples, the characterization method is carried out using the Internet. Throughout the world, the processing and, if appropriate, collection of samples is carried out by means of loosely organized groups of between several hundred to a thousand persons.

In the context of the use of the invention within a data network, a device according to the invention for carrying out the method is to be advantageously considered as a system which is divided in two, composed of a server system and a processing device.

In this context, the server system has a device for storing patterns, a unit for generating characterization proposals for the stored patterns, a memory for storing the characterizations which are assigned to the patterns and a communications device for communicating with a processing device for evaluating and processing the characterization proposals. As counterpart, the processing device for evaluating and processing characterization proposals for the patterns is configured in such a way that it comprises a display for displaying the patterns and the associated characterization proposals and an input unit for inputting the assessment of the characterization of the pattern and/or for deleting or modifying the characterization. Furthermore, the processing device has a communications unit for communicating with a server system for storing patterns and characterizations and for generating characterization proposals.

With the objective of allowing as many characterization processes as possible to run simultaneously, it is advantageous if the server system is connected to a plurality of processing devices.

The server system can also comprise a second server configured to store a plurality of patterns, to store plurality of characterizations, and to generate a plurality of characterizing proposals; and a communications unit configured to communicate with the second server.

What is claimed is:

1. A method for characterizing a pattern present as stored information, the method comprising:
   generating a characterizing proposal for the pattern automatically based upon the pattern using a server computer system, the pattern being on the server computer in electronic form;
   presenting the pattern in electronic form and the characterizing proposal to a client computer using a computer program via the Internet so as to enable a user to perform an evaluation of the characterizing proposal; and
   receiving an evaluation input from the user at the server computer system, the evaluation input being one of an acceptance input of the characterizing proposal and a rejection input of the characterizing proposal, wherein the rejection input includes an alternative characterizing proposal for the pattern.

2. The method as recited in claim 1, wherein the user is a processing employee.

3. The method as recited in claim 1, further comprising storing the characterizing proposal as a characterization of the pattern when the evaluation input is the acceptance input, and receiving and storing the alternative characterizing proposal as the characterization of the pattern when the evaluation input is the rejection input.

4. The method as recited in claim 1, further comprising generating a plurality of further characterizing proposals and storing the characterizing proposal and the plurality of further characterizing proposals in a database before the step of presenting the pattern and the characterizing proposal.

5. The method as recited in claim 1, wherein the generating and the presenting are performed in real time with respect to the evaluation by the user.

6. The method as recited in claim 1, wherein the pattern is an image and the presenting includes presenting the image and the characterizing proposal together on a display.

7. The method as recited in claim 6, wherein the presenting includes presenting the characterizing proposal as a closed line configuration superimposed on the image.

8. The method as recited in claim 1, further comprising manually generating the alternative characterizing proposal and receiving and storing the alternative characterizing proposal as the characterization of the pattern when the rejection input is received.

9. The method as recited in claim 1, further comprising generating a second characterizing proposal using the computer system when the rejection input is received, the second characterizing proposal being generated using a more complex generation algorithm than for generating the rejected characterizing proposal.

10. The method as recited in claim 1, further comprising using the characterizing proposal as the basis for a second pattern when the evaluation input is a rejection.

11. The method as recited in claim 1, wherein the presenting includes presenting the pattern and the characterizing proposal to a plurality of client computers so as to enable a plurality of users to perform an evaluation of the characterizing proposal, and wherein the receiving includes receiving a plurality of evaluation inputs.

\* \* \* \* \*